United States Patent [19]

Rakhodai et al.

[11] Patent Number: 4,860,100
[45] Date of Patent: Aug. 22, 1989

[54] SYNCHRONIZATION SYSTEM FOR A SEMI-DIGITAL SIGNAL

[75] Inventors: Issa Rakhodai, Suresnes; Serge G. Lefebvre, Val de Reuil; Pascal Couderc, Courbevoie, all of France

[73] Assignee: U.S. Philips Corporation, New York, N.Y.

[21] Appl. No.: 154,178

[22] Filed: Feb. 8, 1988

[30] Foreign Application Priority Data

Feb. 6, 1987 [FR] France ............................... 87 01471

[51] Int. Cl.$^4$ ............................................... H04N 5/04
[52] U.S. Cl. ..................................... 358/148; 358/153
[58] Field of Search ................. 358/13, 153, 154, 172, 358/173, 171, 148, 141; 455/237, 246; 375/98, 111

[56] References Cited

U.S. PATENT DOCUMENTS 4,707,730 11/1987 Alard ..................................... 358/13

FOREIGN PATENT DOCUMENTS 0255289 of 0000 European Pat. Off. .
8704034 7/1987 United Kingdom .
8705770 9/1987 United Kingdom .

OTHER PUBLICATIONS

Displacement Measurement and Its Application in Interframe Image Coding, Jain e al; IEEE Transactions on Communications, vol. COM-29, No. 12, Dec. 1981.
TV Bandwidth Compression System by Contour Interpolation, Ando et al., Electronics and Communications in Japan, vol. 49, No. 6, Jun. 1966, pp. 41–49.
Analyse De Structures De Sous-Echantillonnage Spatio-Temporel D'Un Signal TVHD En Vue De Sa Transmission Dans Un Canal Mac, Bernard et al; Colloque TVHD 87.

Primary Examiner—Howard W. Britton
Assistant Examiner—David E. Harvey
Attorney, Agent, or Firm—Edward W. Goodman

[57] ABSTRACT

A system which provides synchronization with frame synchronization words of a partially digital signal, such as that of the D2MAC television standard. It is provided that three modes of operation are established sequentially. In a first mode, the values necessary to control the gain and the d.c. level of the television signal are obtained by means of a peak detector (18). Similarly, in a second mode, the peak detector is enabled only during the digital signal periods of the D2MAC signal. Finally, in the third mode, the setting values are obtained by arrangements (13, 8) which depend on the clamp plateau measurement of each line and of line 624. The television signal is converted into a digital signal by an analog/digital converter (6), which, more specifically, feeds the digital arrangement (8) for measuring the picture plateaus; the results of the peak detector measurement (18) are also converted into digital values (17), managing the procedure and the processing of at least a portion of the control signals is effected by a microprocessor (33) and certain control signals are again converted into analog values by a digital/analog converter (10).

8 Claims, 3 Drawing Sheets

SYNCHRONIZATION SYSTEM FOR A SEMI-DIGITAL SIGNAL

BACKGROUND OF THE INVENTION

The invention relates to a system for providing the synchronization of a television receiver intended to receive a signal, more specifically a signal of the "MAC" type, for example, DMAC or D2MAC which conveys the luminance and analog color information components associated with periods of what is referred to as a duobinary signal, which signal comprises once in every frame analog frame reference voltage plateaus for the black, grey, white levels, and a duobinary portion containing more specifically, a synchronization signal, the "Frame synchronization word". The frame synchronization word passes through the system via a variable gain amplifier and via a continuous component aligning device, the system including a duobinary signal decoding device, a peak detector for measuring and storing the peak values of the signal and associated means for applying, on the basis of these values, to the aligning device a datum for the correction of the so-called continuous component and, to the amplifier, a datum for the gain control, a measuring arrangement for measuring the levels of said frame reference voltage plateaus of each frame and associated means for applying, based on these levels, a gain control value to the amplifier, and a word detector for recognizing the frame synchronization word.

The problem presented has its origin in the fact that, to ensure a fail-safe detection of the digital frame synchronization words, it is necessary to correctly check the level of the continuous component of the signal and its amplitude beforehand, while for the control of these values, one is to base oneself on the reference voltage plateau which cannot be used until after synchronization has been detected. These reference voltage plateaus will hereafter be called "plateaus".

Systems have been proposed, as for example in the European Patent Application EP-A 0.167.430, in which two consecutive operating modes are used. The peak values of the signal are first measured. These values are denoted Vmax and Vmin, values A1=Vmax−Vmin and B1=(Vmax+Vmin)/2 and can be calculated. The value A1 gives the range on the basis of which the gain of the variable-gain amplifier is regulated. The value B1 gives the continuous component and renders it possible to adjust the latter. Thanks to the coarse adjustment obtained during this first mode, the frame synchronization words can be detected and consequently, a synchronization can be obtained on the basis of which it is possible to find the plateaus to ensure accurate adjustments of the gain and the continuous component.

Using this system has several disadvantages; actually the recognition of the frame synchronization word is not a sure indication that synchronization has been reached, that is to say that there is perfect synchronization, and subsequent to the decision taken after the recognition of the frame synchronization word, several difficulties may become apparent, more specifically in the following cases:

it is assumed that synchronization has been obtained and that the system is really in synchronization: the change from one mode to the other is critical, sudden signal transients may occur.

it is assumed that synchronization has been obtained while actually there is no synchronization: in this case the plateaus do not appear at the instants at which they are expected and the adjustment based on them is faulty.

a confirmation of the synchronization is preferred and the recognition of a second frame synchronization word is waited for: it being possible that the content of the pictures may give rise to a faulty alignment, the recognition of a second word may be very difficult.

SUMMARY OF THE INVENTION

The invention has for its object to provide a system in which these difficulties are avoided. For that purpose, the system according to the invention, is characterized in that a processor for managing the use of these various devices establishes, one after the other, three difficult modes of operation, a first mode established at the start of the system in which the processor puts the peak detector and its associated means for controlling the gain and the continuous component into operation and in which it permanently enables the peak detector, a second, similar, mode but in which the processor enables the peak detector only during the periods of the duobinary signal and during line 624, this mode being established when the word detector has recognized a frame synchronization word, and a third mode in which the processor is authorized to put the frame plateau measuring device and its associated means into operation, this mode being established when a word position checking device has detected coincidence between a new frame synchronization word and a signal supplied by a time counter at each of the consecutive instants corresponding to total frame periods after the previously recognized frame synchronization word.

The system can moreover advantageously be provided with a frame counter, and means to enable the return from the second or the third mode to the first mode when a predetermined frame count has been reached without a frame synchronization word having been recognized correctly. This increases the reliability.

Preferably, an arrangement based on line plateaus is made operative during the second mode, whereas it will only be used after the change to the third mode. This renders it possible to avoid a signal jump during the change to the third mode.

In a preferred embodiment, the system is characterized in that the amplified signal, whose continuous component has been adjusted, is applied to an analog/digital converter whose digital output value is applied to the frame plateau level measuring arrangement which contains digital samplers sampling the levels of these frame plateaus. These levels are applied to the processor for deriving therefrom, in the third mode, a value which is applied to a digital/analog converter whose analog output signal is applied to a gain control terminal of the amplifier. This embodiment can further be characterized in that it includes an analog peak detector whose output signals are applied to an adder to control the shift circuit during the first two modes, and to an analog/digital converter which applies the peak values in digital form to the processor to derive therefrom, during the first two modes, a value which is applied to a digital/analog converter whose analog output signal is applied to a gain control terminal of the amplifier. A still further elaboration of this embodiment can be characterized in that it includes an analog wired alignment arrangement based on the line plateaus, and in that the processor establishes the third mode by selecting, by means of a change-over switch, the signal supplied by the alignment arrangement instead of the signal supplied by the shift circuit.

This embodiment provides an advantageous division between the use of logic and digital functions, and wired material functions.

The following description which is given by way of non-limitative example with reference to the accompanying drawings will make it better understood how the invention can be carried into effect.

DETAILED DESCRIPTION OF THE INVENTION

The system shown in FIG. 1 includes a signal path established from the input terminal 2 to an intermediate line 3 via a variable gain amplifier 4 amplifying the signal, followed by a shift circuit 5 for adjusting the continuous component (or DC level) of the signal, and an electronic change-over switch 24 whose object will be explained hereinafter and which in the first and second modes, ensures the connection shown. In practice, the continuous component can vary from line to line, for example in the event of hum in the power supply, or even when it is voluntarily rendered variable to improve the energy distribution in the transmitter. It is then recommendable to ensure the control in each line. The level of this continuous component may, however, be considered to be constant during a line, this being the reason that it is denoted as being continuous.

The amplifier and the control circuits must be controlled with precision to obtain a signal (on the line 3) whose levels are defined in an absolute manner.

Figure 2:
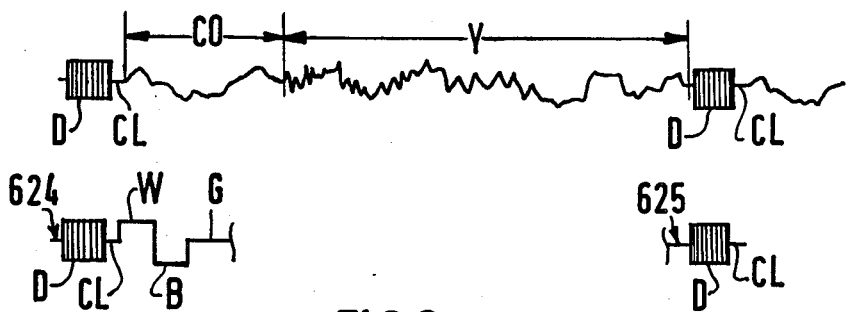
FIG. 2 illustrates signal waveforms to be processed by the system.

FIG. 2 shows, at the top of the Figure, a signal during any picture line. It first has a period D of digital data, the so-called duobinary period whose duration is 10 μs and which supplies the data for the sound and the television scanning synchronization. For that purpose it contains specific bit sequences, denoted as the line synchronization words. This period D is followed by a line plateau CL which indicates the grey value. This line plateau ("clamping plateau" in the technical language) has a duration of only 0.75 μs. It is followed by an analog signal period CD which supplies the color information components, and by a likewise analog signal period Y supplying the luminance information components. Finally, the duobinary period D of the subsequent line starts.

At the bottom of FIG. 2, the beginning of a specific line, line number 624, is shown which appears only once in each picture and in which the periods D and CL are followed by three reference plateaus W, B, G, each having a duration of 8 μs, which indicate the white, black and grey values, respectively. The data following these thresholds up to the subsequent line are not a part of the invention. The subsequent line 625 contains the frame synchronization word.

The fundamental function of the system is to recognize in a reliable manner the frame synchronization word contained in the duobinary signal D. In FIG. 1, the circuit 15 connected to the intermediate line 3 is a duobinary signal decoder which shapes the digital data and allows clock recovery. It applies digital data to a word detector 32 which has for its object to recognize the frame synchronization word. These circuits, which are known to a person skilled in the art, can only ensure the recognition of that word when the levels of the signal are correctly controlled. Hence, to obtain a correct amplitude and a correct continuous component on the line 3, it is important that measures are taken to render it possible to measure the plateaus W, B, G, CL on the basis of which the control is effected. It is then necessary to know at what moment the plateaus appear, that is to say, the frame synchronization words must first have been recognized.

To break from this vicious circle, the system is provided with a peak detector 18 (or 7, FIG. 6) to measure and store the peak values of the signal. When the system is made operative, a first mode is established in which the peak values are measured over the total signal, that is to say the peak detector is in continuous use. The overall system is managed by a processor (Pr) 33 which more specifically comprises a microprocessor with its specific software and is associated with specialized hardware circuits (denoted "wired" circuits). Therefore, the processor 33 establishes the first mode when it is made operative. The difference between the maximum and minimum values represents a quantity which, after having been processed by the processor 33, provides a gain control value for the amplifier 4. A mean value, that is to say in practice a value proportional to one-half the sum of the maximum and minimum peak values, is applied to the shift circuit 5 to correct the continuous component.

Thus, a first estimation of the control values is obtained. It should be noted that the alignment thus effected depends on the picture content and can be faulty, with the exception of line 624 and some subsequent lines, which nevertheless renders it possible to recognize the frame synchronization word at line 625.

When a frame synchronization word has been recognized for the first time by the word detector 32, this word detector 32 conveys a signal vai the line 37 by means of which the second mode is triggered to the processor 33.

In this second mode, the quality of the synchronization is not absolutely ensured, since only one word has been detected so far. It would undoubtedly be dangerous to desire the immediate use of the plateaus CL, W, B, G. The understanding has come into being, that it is possible, even without finding these plateaus, to improve the control by using peak detector 18 only during the duobinary periods. These periods have a rather long duration (10 μs) so that they can be found more easily than the plateaus, more specifically, more easily than the clamping level CL which has a duration of only 0.75 μs. Since the duobinary periods have a constant peak amplitude and are symmetrical, although the mean content depends on the quantity of "1" and "0", the peak values which can be derived therefrom are more accurate. Thus, in the second mode an inhibit command, generated by the processor 33 only outside the durations of the duobinary signals and line 624, estimated on the basis of the instant at which the first frame synchronization word is detected, is transmitted to the detector 18 via the inhibit connection 26. When the detector 18 receives this command, it does not take the values of the signal into account.

In the course of this second mode, the probability that a frame synchronization word is recognized is much greater. It is however necessary to check whether the synchronization is certain. To that end, an arrangement is provided to check the position of the word, that is to say the duration between two consecutively detected frame synchronization words. This arrangement includes a time counter 31 comprising a clock and a counter. This counter is reset to zero by the signal on the connection 37 each time a frame synchronization word is detected. Each time a count corresponding to an integral number of frame periods has been reached, the counter produces a signal and a comparator checks whether there is coincidence between this signal and the detection of the received frame synchronization word. When such a coincidence is found, the time counter 31 conveys a command is conveyed via the connection 25 to the processor 33 which establishes the third mode.

In the case in which the words subsequent to the first word are not produced at the appropriate instant, this implies that the synchronization is not correct and it may then be possible that the assumed duobinary period is actually some other period, so that the second mode is not suitable. To take this into account, the time counter 31 includes inter alia a frame counter which, via a connection 27, conveys pulses to the processor at each instant at which a new frame is expected. If a predetermined number of pulses is received over the connection 27 without the aforesaid coincidence being detected, which coincidence would cause a pulse on the connection 25, the processor 33 re-establishes the first mode again. This is effected via software. Moreover, the same effect can also occur in the third mode.

The above-mentioned predetermined number of pulses is determined by the processor 33. It may be any randomly chosen number. In an improved version of the system, this predetermined number of pulses can also be calculated by the processor 33 as a function of the noise level. The noise can be measured by a known circuit, not shown. It will be obvious that, to render this noise measurement possible, synchronization must have been obtained. This procedure can consequently only be used in the case in which a change to the second mode would be made after first having obtained the third mode.

When the third mode is established, the plateaus are preferably used only to supply the control values. The control of the continuous components is then realized by means of an alignment arrangement 13 acting on the line plateaus CL. In the preferred embodiment, the alignment arrangement 13 is connected in parallel with the shift circuit 5. This alignment arrangement 13, which is denoted the "dynamic clamping means" is, similar to that used in ordinary television sets. The aligned signal is transferred by the change-over switch 24 which is controlled by the processor 33 which, in the third mode, connects the output of the alignment arrangement 13. A pulse supplied by the time counter 31 is applied to the alignment arrangement 13 at a suitable moment. When it receives this pulse the alignment arrangement 13 aligns the signal.

Moreover, a picture measuring arrangement 8 receives, via a connection 30, a synchronization pulse on the basis of which it stores the three values of the signal for the plateaus W, B, G. The results of the picture plateau measurement supplied by the measuring arrangement 8 is preferably used by the processor 33 to provide, in the third mode, the gain control value for the amplifier 4.

When the devices on the basis of the plateaus are made operative at the instant at which a change is made to the third mode, is a risk that incorrect values are supplied since they need a certain time to supply the correct values. It is therefore advantageous for the alignment arrangement 13, which is based on the line plateaus, to be already made operative from the second mode onwards to be used immediately from the instant the change to the third mode is made. Since the fact that the frame received last has been correctly synchronized is precisely the fact which causes the change to the third mode, the mesurements effected on the plateaus during said last frame preceding the change to the first mode are consequently correct and can be used immediately.

In the preferred embodiment, the measuring arrangement 8 is in the form of a digital circuit. The amplified signal whose continuous component has been adjusted and is available on the line 3, is applied to an analog/-digital converter 6 whose digital output value is applied, via a multi-conductor connection 34, to the measuring arrangement 8, which is a digital sampler storing the digital value of the signal on the connection 34 at the accurate instant of the respective relevant plateaus, which instant is indicated by the time counter 31 via the connection 30. The measuring arrangement 8 stores these values and supplies them to the processor 33. During the third mode, this processor 33 calculates, on the basis of the white and black plateau values supplied by the measuring arrangement 8, a digital value which is a function of the amplitude of the signal and is applied to a digital/analog (D/A) converter 10 which produces an analog signal which is applied to a gain control terminal 38 of the amplifier 4.

As regards the peak detector 18 which processes the signal coming from the amplifier 4, this detector is an analog circuit which can be provided in a simple and known manner: it basically comprises a rectifier system with a capacitor. It supplies the values of the maximum and the minimum values, for example as the respective positive detection and negative detection output signals of the detector. The levels of these signals are stored in capacitors, and an analog adder circuit 20, for example a simple resistive network, produces one-half the sum of the relative levels at the input "—" of the shift circuit 5 to control the continuous component in the first and second modes.

The maximum and minimum levels provided by the peak detector 18 are moreover converted into digital values in an analog/digital (A/D) converter 17. The peak values stored in the capacitors develop slowly and consequently it is not necessary for the A/D converter 17 to be of a fast type. The digitized values are applied to the processor 33 via the connection 39. This processor 33, in the first and second modes, calculates their difference, which represents the amplitude of the signal coming from the amplifier 4, and obtains therefrom an appropriate digital value which is applied to the digital-/analog converter 10 as in the third mode. Passing from the modes 1 and 2 to the mode 3 is consequently realized in a simple manner by basing it on the values supplied by the measuring arrangement 8 instead of on the values originating from the A/D converter 17.

Figure 1:
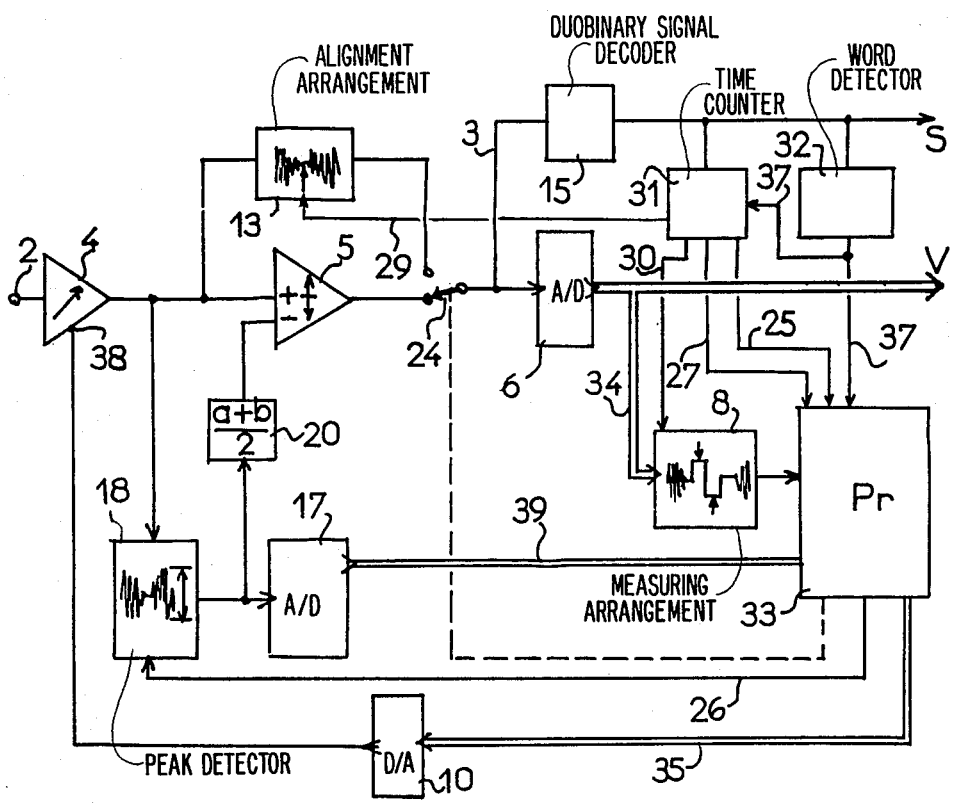
FIG. 1 is a block circuit diagram of a first embodiment of the system.
Figures 3, 4:
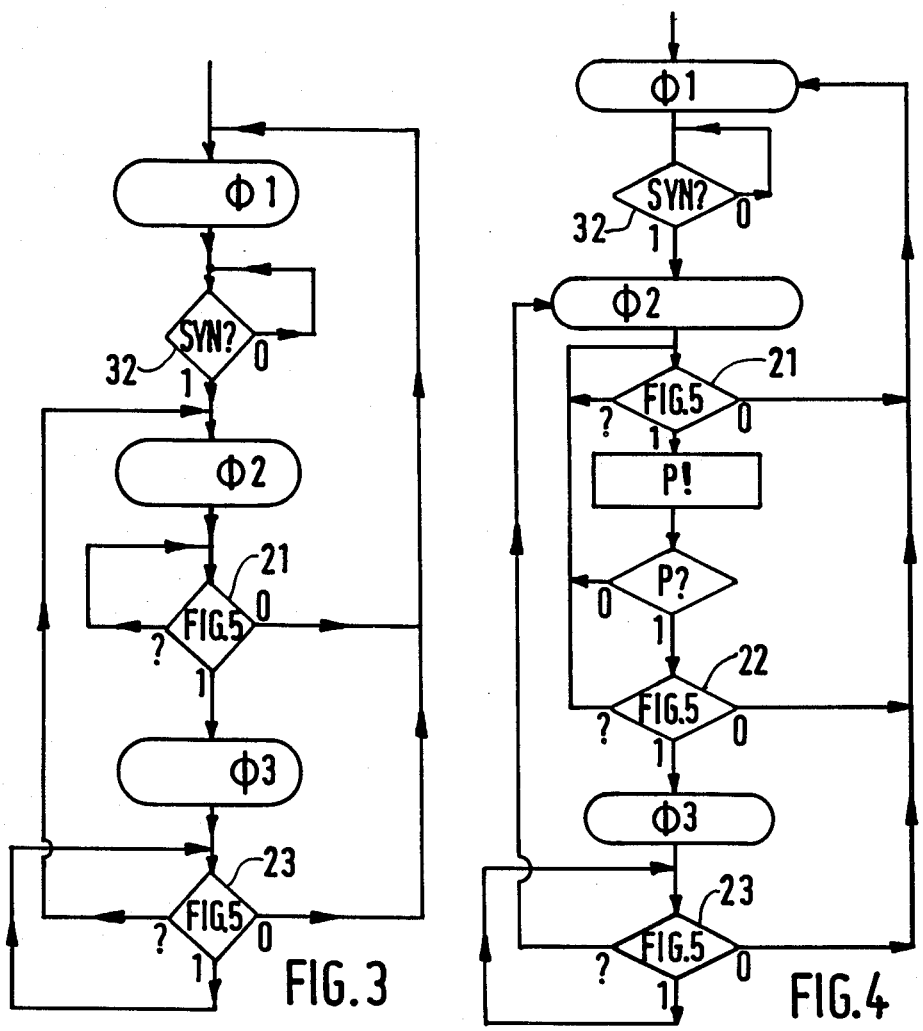
FIGS. 3 to 5 are diagrams illustrating the procedure performed by the system.
Figure 5:
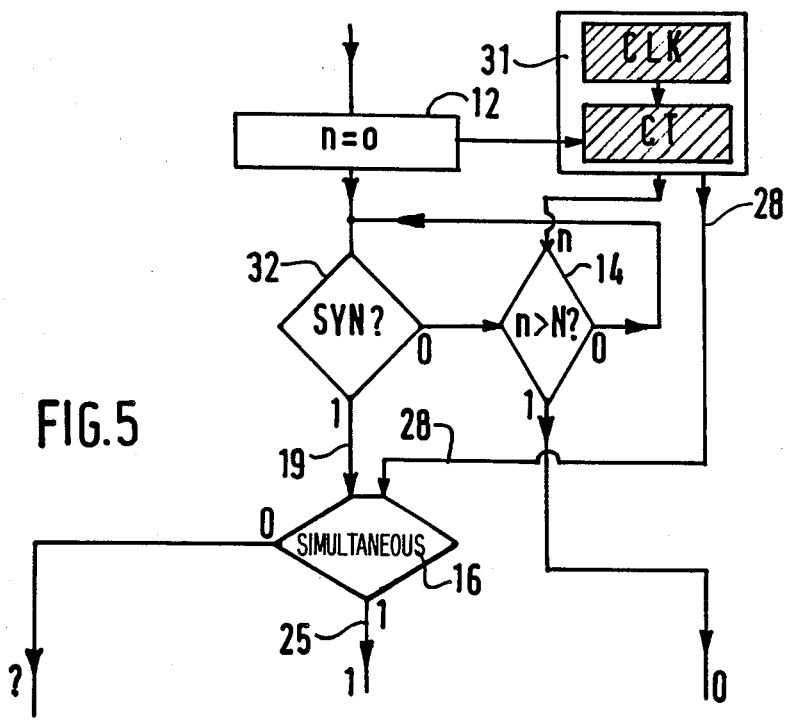

In the FIGS. 3, 4 and 5 some of the references designate both an operation and the hardware used for this operation in FIG. 1. At the output of the diamond-shaped boxes which symbolize a test, the references 0, 1, ? have for their respective meanings "NO", "YES", "MAYBE".

FIG. 3 gives a better insight in the procedure performed by the system and described in the foregoing.

The procedure starts at top of the Figure by setting it to the first mode ($\phi$ 1). Thereafter, the diamond "SYN ?" is a symbolic representation of the search for a frame synchronization word. It is also given the reference numeral 32, the same reference number given to the word detector 32 of FIG. 1. The search continues as long as this word has not been recognized (0). When the word is recognized (1), the second mode is established ($\phi$ 2). Then a more complete test 21 (FIG. 5) is performed, which can supply 3 answers. If the answer is "NO" (0) the first mode is triggered again ($\phi$ 1). If the answer is "MAYBE" (?) the test is continued. The answer "YES" (1) has for its result that the third mode ($\phi$ 3) is started. After having passed to the third mode, the test 23 (FIG. 5), which is identical to the test 21 performed between the second and the third modes, is effected. The answer "YES" (1) causes the test to be continued, which consequently is permanently the case as long as the third mode is active, the answer "NO" (0) causes the direct re-establishment of the first mode without passing again through the second mode. Finally, the answer "MAYBE" (?) causes the second mode ($\phi$ 2) to start.

There is a special case in which the position of the clamping plateau is not known beforehand, that is to say, the plateau is not defined in the transmission standard. It is then indicated during the transition by a digital data included in the duobinary period. The diagram of FIG. 4 is a visual representation of the procedure to be performed in this case. It is identical to that of FIG. 3 with the exception of an operation symbolized by P!, a test P? and a test 22 which is always the test of FIG. 5. The answer YES(1) of the test 21 now does not directly result in the third mode being established, but in the establishment of a new group of operations. The operation P! designates the search for a group of bits defining the position of the plateaus. The test P? answers the question "has the position been found?" by YES or NO. If the answer is NO, the test 21 is requested again; if the answer is YES, a test 22 is performed which is of the same nature (FIG. 5) as the test 21. The results 0 ? of the test 22 have the same effects as those of test 21. The result 1 of the test 22 causes the establishment of the third mode ($\phi$3).

FIG. 5 is a detailed illustration of the set of operations symbolized by each diamond 21, 22, 23 in the FIGS. 3 and 4. At the beginning of the test, a number n, indicating a number of frames, is reset to zero. This implies, in practice, that the frame counter CT of the counting circuit 31 is reset to zero, thereafter a frame synchronization word is searched (SYN?) by the word detector 32. As long as a word has not been found (0), the test n>N? is performed, that is to say "is the number n of frames counted by the counter CT greater than a predetermined number N?", if the answer to this internal test 14 is YES (1), the output NO(0) of the global test of FIG. 5 is activated. If the answer is NO(0) the search SYN? is performed again. When a frame synchronization word is found (1), a pulse is applied to the input 19 of the test arrangement 16. Moreover, a pulse is conveyed to the input 28 by the frame counter CT at each of the consecutive instants at which a frame synchronization word is expected, these instants being determined on the basis of the previously detected frame synchronizing word. The test 16 designates whether a pulse appeared at the same instant at the two inputs 19 and 28, If no (0), the output "?" of the global test of FIG. 5 is activated. If yes, the output 1 of the global test is activated. The test 16 is performed by a wired circuit which constitutes an arrangement for checking the position of a word, and which in FIG. 1 is assumed to be included in the time counter 31, and conveys its result to the processor 33 via the connection 25.

The bits of the duobinary portion appear at a rate of approximately 10 MHz. An ordinary microprocessor is not capable of processing data at this rate. Therefore, the word detector circuit 32 uses hardware means, that is to say wired means. This also holds for the test circuits performing the test 16 and SYN? of FIG. 5 and for the clock and counter circuits 31. The peak detector 18 and the measuring arrangement 8 comprise, at the same time, wired functions and functions controlled by software. The peak detector 18 includes a low-pass filter to eliminate the parasitics which might falsify the measurement. Managing the total procedure and the test n>N? is effected by software means of the processor 33. In the foregoing, it is described that in the third mode level plateaus are "preferably" used. In practice, the third mode is in essence defined as the mode in which a sure indication of the synchronization is obtained after having passed through the second mode, in which only the data of the peaks measured in the time windows are used. In this third mode, the processor 33 is no longer limited to peak measurements only, it is "authorized" to make the measuring arrangement 8 and the alignment arrangement 13, described in the foregoing, operative, but it always disposes of the data supplied by the peak detector 18 and can decide to use those data which will give the best results: the possibility is not excluded, for example when a very noisy signal interferes with the line plateau levels, that the third mode is modified to, for example, ensure the alignment by means of the peak detector 18 and its associated means, i.e. the shift circuit 5 and the adder circuit 20, while however, the measuring arrangement 8 is normally used to control the gain (10, 38, 4) or, inversely, to control the gain on the basis of the peak data produced by the A/D converter 17, while however, the aligning arrangement 13 is normally enabled by the switch 24. The processor 33 consequently establishes the third mode as indicated, but may thereafter, according to circumstances, form variants.

Figure 6:
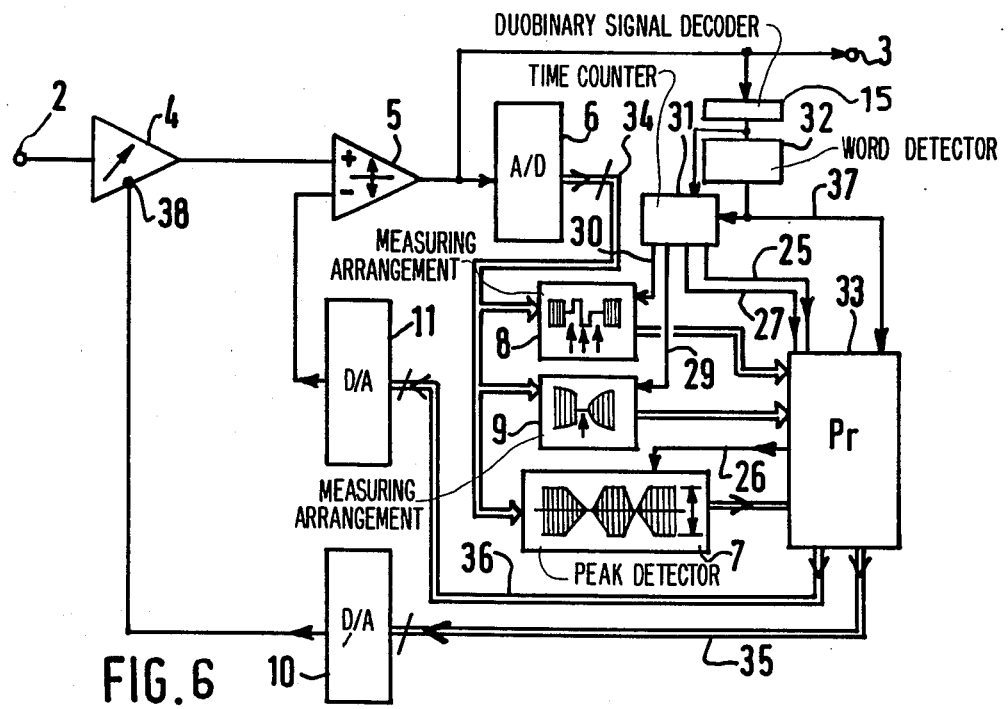
FIG. 6 is a block circuit diagram of a second embodiment of the system.

In a further embodiment which is shown in FIG. 6, the peak detector 7, the measuring arrangement 8 for measuring the frame plateaus, and a measuring arrangement 9 for measuring line plateaus, are implemented as digital circuits. The amplified signal, whose continuous component has been adjusted and which is available on the line 3, is applied to an analog/digital converter 6 whose digital output signal is applied, via a multi-conductor connection 34, to the peak detector 7. This peak detector 7, which is controlled by a clock pulse, is provided with means for periodically reading the digital value present on the connection 34, to compare the digital value to a first stored value, and to replace the first stored value by the value read when the value read is higher than the first stored value, and similarly, as regards a second stored value, when the value read is smaller than the second stored valve. These two stored values are permanently applied to the processor 33. The processor 33 derives from their difference a first value which represents the amplitude and from their sum a second value which represents the continuous component. The first value is applied to the digital/analog (D/A) converter 10 which produces an analog signal which is applied to a gain control terminal 38 of the amplifier. The second value is applied to a digital-/analog converter 11 producing an analog signal which is applied to a shift control terminal "−" of the shift circuit 5.

The digital value produced by the A/D converter 6 is also applied to the measuring arrangements 8 and 9, which are digital samplers storing the digital value of the signal on the connection 34 at the precise instant of the respective plateaus relating to them, which instant is indicated by the time counter 31 via the connections 29 and 30. The measuring arrangements 8, 9 store these values and supply them to the processor 33. During the third mode, the processor 33 calculates, on the basis of the values supplied by the measured arrangement 8, that is to say more specifically the values of the white and black plateaus, a first digital value which is a function of the amplitude of the signal and is applied to the D/A converter 10 as in the foregoing. Based on the values supplied by the measuring arrangement 9, that is to say at each line having the grey plateau value, the processor calculates a second digital value as a function of the continuous component of the signal, which is applied to a digital/analog converter 11 whose output signal controls the shift circuit 5 as in the foregoing.

In this embodiment, the alignment arrangement 13 based on the line plateaus is not separate from the shift circuit 5, and the source of the control signals changes according to the mode. The alignment arrangement 13 of FIG. 1 has therefore been omitted and the switch 24 is not necessary anymore. This embodiment nowadays requires more expensive circuits than those shown in the circuit diagram of FIG. 1, more specifically for the digital circuits 7 and 9, which must be particularly fast. But the development in the art towards the systematic use of digital circuits might completely change the problem and the way to handle it.

We claim:

1. A system for providing synchronization of a television receiver for receiving signals each of which conveys luminance and analog color information components along with a duobinary period, a predetermined number of said signals forming a picture frame wherein one signal of said number of signals further comprises analog reference frame voltage plateaus corresponding to line, black, grey and white voltage levels, and the duobinary period of said one signal containing a frame synchronization word, this frame synchronization word passing through the system via a variable gain amplifier and an aligning device for providing an alignment of a continuous component of each of said received signals, the system includes a duobinary signal decoding device, a peak detector for measuring and storing maximum and minimum values of each of the received signals, means associated with said peak detector for applying, based on said maximum and minimum values, a datum to the aligning device for correction of the continuous component of each of said received signals and a datum to a gain control input of the variable gain amplifier, a measuring arrangement for measuring the voltage levels of said plateaus of said one received signal, means associated with said measuring arrangement for applying, based on these voltage levels, a gain control value to said variable gain amplifier, and a word detector for recognizing the frame synchronization word; wherein the system further comprises a processor for controlling said system, said processor establishing, one after another, three different modes of operation, a first mode of said different modes being at a start-up of said system in which the processor activates the peak detector and the means associated with said peak detector to provide the datum for controlling the gain and the continuous component of the received signals, in which the peak detector is continuously enabled, a second mode of said different modes in which the processor provides the activation of the peak detector only during the duobinary period of each of said number of signals and during all of a next to last of the received signals in the each picture frame, the second mode being established when the word detector has recognized a frame synchronization word, and a third mode of said different modes in which the processor activates the plateau voltage measuring arrangement and the means associated with the plateau voltage measuring arrangement for applying a gain control value to the variable gain amplifier, the third mode being established when a word position checking device has detected coincidence between a new frame synchronization word and a signal supplied by a time counter at consecutive instants, each corresponding to a period of said picture frame, after a previously recognized frame synchronization word.

2. A system as claimed in claim 1, wherein said processor is provided with means for returning said system from the second or the third mode to the first mode when a predetermined frame count has been obtained by a frame counter without the word position checking device having detected a coincidence.

3. A system as claimed in claim 2, wherein said system is provided with noise measuring means and means for calculating said predetermined frame count as a function of a noise level.

4. A system as claimed in claim 1, wherein said system further comprises an arrangement for effecting alignment on the basis of a line plateau, wherein the alignment arrangement is made operative during the second mode.

5. A system as claimed in claim 1, wherein the system further comprises an analog/digital converter to which the received signals, having been amplified and whose continuous component has been adjusted, are applied, a digital output value from said analog/digital converter being applied to the plateau voltage measuring arrangement, which includes digital samplers for sampling the voltage levels of the plateaus, said sampled voltage levels being applied to the processor for deriving therefrom, in the third mode, a value which is applied to a first digital/analog converter having an analog output signal which is applied to a gain control terminal of the variable gain amplifier.

6. A system as claimed in claim 1, wherein said peak detector is an analog peak detector having output signals which are applied to an adder for controlling the aligning device during the first and second modes, and to an analog/digital converter which applies the maximum and minimum values, in digital form, to the processor to derive therefrom, during the first and second modes, a value which is applied to a first digital/analog converter having an analog output signal which is applied to a gain control terminal of the variable gain amplifier.

7. A system as claimed in claim 6, wherein the system includes an analog wired alignment arrangement response to a line plateau, and the processor establishes the third mode by selecting, by means of a change-over switch, a signal originating from the alignment arrangement instead of the signal supplied by the aligning device.

8. A system as claimed in claim 5, wherein the digital output value produced by the analog/digital converter is also applied to the peak detector, said peak detector being a digital circuit for storing maximum and minimum values which are applied to the processor for deriving, in the first and second modes, a first value from their difference and a second value from their sum, said first and second values being applied to said first digital/analog converter and to a second digital/analog converter having an analog output signal which is applied to a control terminal of the aligning device, the digital output value produced by the analog/digital converter is also applied to said plateau voltage measuring arrangement to form measured values which are applied to the processor to establish the third mode by controlling means for selecting signals supplied by the plateau voltage measuring arrangement instead of signals from the peak detector.

* * * * *